United States Patent [19]
DiPaolo

[11] Patent Number: 4,665,684
[45] Date of Patent: May 19, 1987

[54] GRASS CATCHER WITH EFFICIENT AIR FLOW

[76] Inventor: Vincent DiPaolo, 424 Maren St., West Hempstead, N.Y. 11552

[21] Appl. No.: 789,132

[22] Filed: Oct. 18, 1985

[51] Int. Cl.⁴ .............................................. A01D 53/06
[52] U.S. Cl. ....................................... 56/202; 56/16.6
[58] Field of Search ................... 56/202, 16.6, 320.1, 56/320.2, DIG. 8, 17.5

[56] References Cited

U.S. PATENT DOCUMENTS

| | | |
|---|---|---|
| D. 228,009 | 7/1973 | Thorud . |
| 2,747,356 | 5/1956 | Peterson ............................... 56/202 |
| 2,855,745 | 10/1958 | Phelps ................................... 56/202 |
| 3,014,330 | 12/1961 | Oberdick ............................... 56/202 |
| 3,499,275 | 3/1970 | Lozen .................................... 56/202 |
| 3,736,736 | 6/1973 | Myers ................................... 56/16.6 |
| 3,816,986 | 6/1974 | Van Der Gaast ..................... 56/202 |
| 4,095,398 | 6/1978 | Aumann et al. . |
| 4,156,337 | 5/1979 | Knudson . |
| 4,193,249 | 3/1980 | Tackett . |
| 4,426,830 | 1/1984 | Tackett . |
| 4,476,668 | 10/1984 | Reilly . |
| 4,522,019 | 6/1985 | Edwards et al. . |

OTHER PUBLICATIONS

"Exalted Welding & Mechanical Repairs Inc.", (brochure).

Primary Examiner—Robert Peshock
Assistant Examiner—John G. Weiss
Attorney, Agent, or Firm—Anthony J. Casella; Gerald E. Hespos

[57] ABSTRACT

A grass catcher is provided for mounting to a lawn mower. The grass catcher includes a generally frustum shaped side wall and opposed front and rear walls. An entry chute is provided adjacent the front wall. The front wall is angled relative to the axis of the grass catcher. The side wall is provided with an array of large apertures extending around the lower portion of the grass catcher, and an array of small apertures extending around the top. The rear wall of the grass catcher is hingedly attached to the side wall to facilitate emptying of the grass clippings therefrom.

13 Claims, 7 Drawing Figures

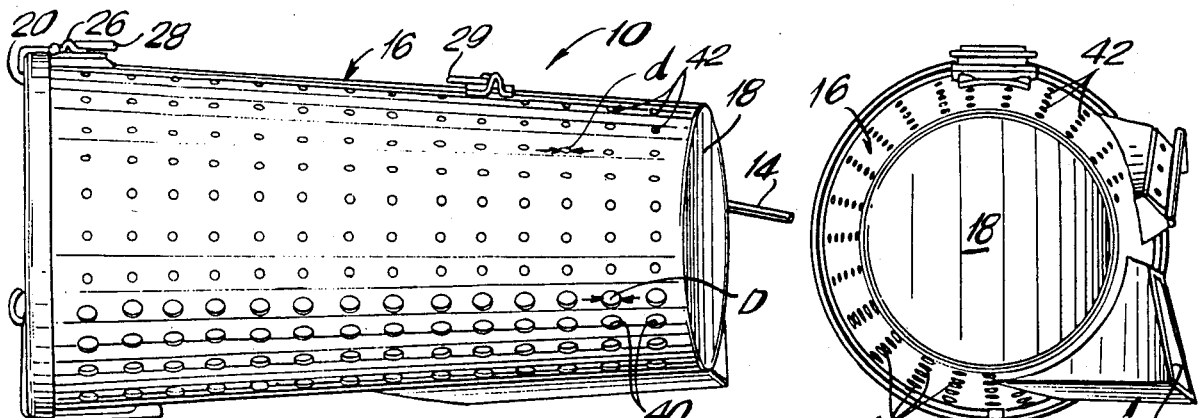
FIG. 4
FIG. 5
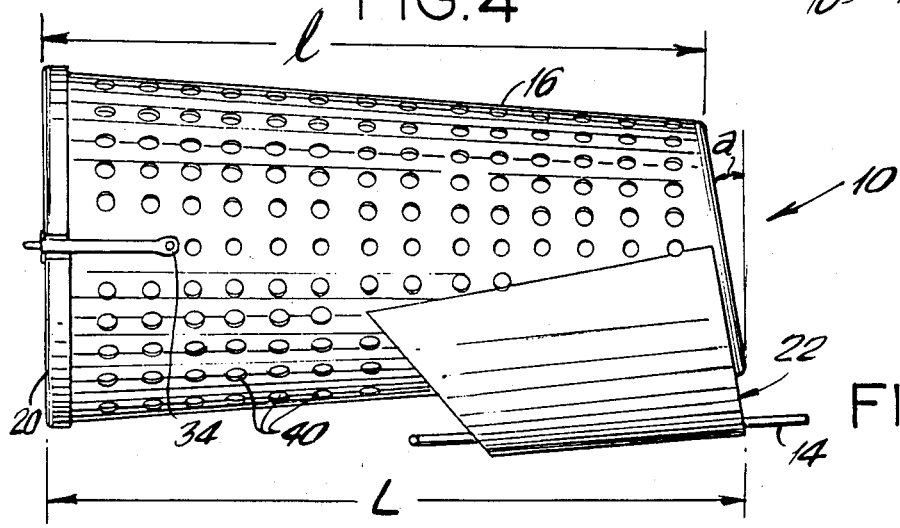
FIG. 6
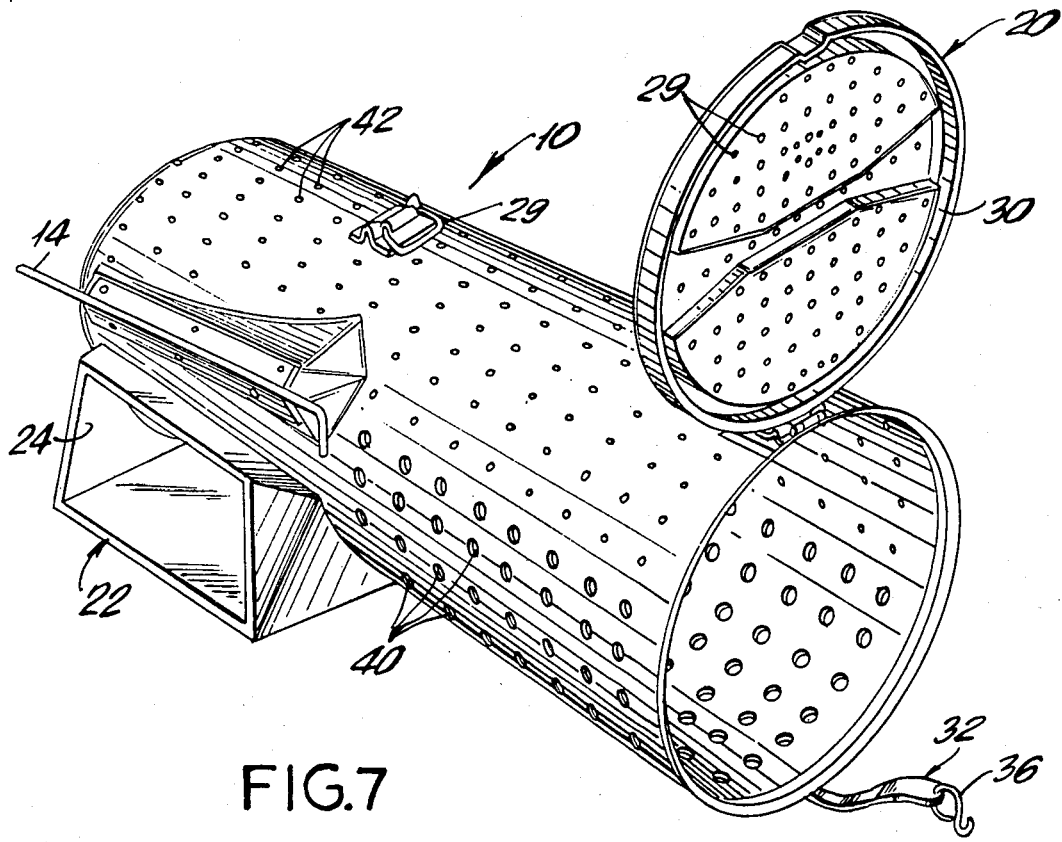
FIG. 7

GRASS CATCHER WITH EFFICIENT AIR FLOW

CROSS-REFERENCE TO RELATED APPLICATION

This application is related to U.S. Design patent application Ser. No. 663,989 filed Oct. 23, 1984 by the applicant, and entitled GRASS CATCHER MADE OF A COMBINATION OF MATERIALS.

BACKGROUND OF THE INVENTION

The grass clippings generated when a lawn is mown often are ejected from the mower in clumps that are not easily dispersed by natural elements such as wind or rain. When these clippings are allowed to remain on the lawn, they may block the flow of water and sunlight to the grass, thereby causing significant damage. Furthermore, the clippings create an unsightly appearance on the freshly mown lawn.

For the reasons explained above, the grass clippings generated when a lawn is mown typically are removed. Raking effectively removes both the grass clippings and other debris such as thatch or litter that may be accumulated on the lawn. However, raking is very time consuming and labor intensive. Therefore, lawn mowers typically are provided with grass catchers which are intended to receive the clippings that might otherwise have been deposited on the lawn.

Grass catchers have taken a variety of forms. For example, many older grass catchers are open-topped trays into which the clippings are sent. Often, however, the grass clippings are blown away from the open-topped grass catcher by the action of ambient wind or by air currents created by the moving lawn mower blades. These open topped grass catchers also typically are difficult to empty neatly.

Other prior art grass catchers define flexible bags that are attachable to the chute of a power lawn mower. These flexible bags often are provided with either an internal or an external support to keep the bag substantially opened, thus facilitating the flow of clippings into the grass catcher. Many such grass catchers are subject to rapid deterioration either due to the decaying action of wet grass clippings adjacent the material of the bag or due to the various stresses created on the material by the supporting structure. Furthermore, the material from which these bags are made generally provides a poor air flow. Consequently the grass clippings often accumulate near the mouth of the prior art grass catcher, thus preventing the complete filling of the bag. As a result of this problem the grass catcher has to be emptied more frequently, thereby adding significantly to the time required to mow the lawn. Furthermore, these grass catchers typically are emptied by shaking the grass out of the opening that is attachable to the chute of the lawn mower. This opening, however, invariably is small, and considerable effort is required to completely empty the bag. Zipper or snap openings have been provided in the opposite end of the bag. However, these mechanical closures often become blocked with grass clippings or other such debris and they seldom function properly.

Other grass catchers have defined enclosures with solid plastic side walls. These prior art structures are easier to empty than a bag, and will not collapse like a bag. However, the solid walls of these grass catchers do not provide a desirable air flow. More particularly, the air flow that carries the grass into the grass catcher often will rebound off the walls of the structure to cause a reversed air flow. Consequently, grass may accumulate immediately adjacent the chute of the lawn mower, thus creating a need for frequent emptying of this prior art solid plastic grass catcher.

Still other grass catchers have been made from a heavy duty metallic mesh material. These structures have been fairly heavy and costly to manufacture. Furthermore, the metallic materials are particularly susceptible to deterioration when subjected to the moisture present in the grass clippings and the various fertilizing chemicals that may be used on a lawn. Thus, the prior art metallic mesh grass catchers must either be made from either an expensive grade of material that is not subjected to decay or they require extensive maintenance to prevent such decay.

In view of the above, it is an object of the subject invention to provide an efficient grass catcher for a lawn mower.

It is a further object of the subject invention to provide a grass catcher that assures a desirable flow of air and grass clippings.

It is an additional object of the subject invention to provide a grass catcher that is inexpensive to manufacture and is low in maintenance.

It is yet another object of the subject invention to provide a grass catcher that is light weight and is easy to dump.

Still another object of the subject invention is to provide a grass catcher that will not be blocked by grass clippings prior to reaching its capacity.

SUMMARY OF THE INVENTION

The subject invention is directed to a grass catcher that defines a container of generally tapered cylindrical or frustum shape. More particularly, the end most distant from the chute of the lawn mower is of greater area than the end closest to the chute of the lawn mower.

The tapered cylindrical or frustum shaped side walls of the grass catcher are formed from a light weight but sturdy plastic material and are provided with a plurality of spaced apart apertures therethrough. The size and spacing between apertures is selected to encourage a circulatory air flow. More particularly the frustum shaped side wall is sufficiently solid to prevent the random outward flow of air as with a wire mesh grass catcher. However, the spaced apart apertures enable a sufficient escape of air to avoid the random rebounding as with solid grass catchers. In a preferred embodiment, these apertures are not of uniform size throughout. More particularly, the apertures along generally the lower half of the grass catcher are larger than those disposed generally along the top half of the grass catcher. As a result of this construction, some of the air which transports the grass clippings will be able to flow through virtually each aperture of the side wall of the grass catcher even when grass clippings are gravitationally deposited on the bottom of the grass catcher. This pattern of air flow through the side wall will achieve a circulatory or cyclonic air flow with an enhanced ability to transport the grass clippings to the far end of the grass catcher. This circulatory or cyclonic air flow is enhanced by the tapered or frustum shape of the grass catcher. The preferred air flow is further attained by forming the smaller end of the grass catcher, or the end thereof closest to the chute of the lawn mower, as a solid surface substantially free of apertures. In contrast, the larger opposed circular end of the grass catcher is provided with apertures. Thus, the solid smaller end of the grass catcher will be likely to channalize the air flow toward the larger end of the grass catcher. This channalization can further be improved by forming the small end of the grass catcher at an angle to the longitudinal axis of the grass catcher. The cyclonic air flow created by this construction will deposit the grass clippings at the maximum distance from the chute of the lawn mower, thus enabling the grass catcher to become completely filled and to prevent blockages adjacent the chute of the lawn mower.

The larger circular end of the grass catcher preferably is hingedly attached to the tapered wall thereof. More particularly, an aluminum or other metallic hinged member can be secured to both the side wall of the grass catcher and the circular end wall thereof to enable the hinged articulated movement therebetween. An appropriate closure means can be provided opposite the hinge to enable the secure closure of the grass catcher. However, the grass catcher can be easily opened to provide a large and convenient opening for dumping the clippings from the grass catcher after it has been completely filled. One preferred closure means includes an elastic strap having a hook on at least one end thereof. The strap can be biased such that the hook engages an appropriate member on either the hinged end wall or on the side wall.

The grass catcher preferably also includes at least one handle to facilitate the lifting and dumping of the filled grass catcher. As explained further below, the grass catcher also is provided with appropriate means for mounting the grass catcher to the chute of a lawn mower.

BRIEF DESCRIPTION OF THE DRAWINGS

FIG. 4 is a second side view of the grass catcher shown in FIG. 1.

FIG. 5 is a second end view of the grass catcher shown in FIG. 1.

FIG. 6 is a bottom plan view of the grass catcher shown in FIG. 1.

FIG. 7 is a perspective view of the grass catcher shown in an opened condition.

DETAILED DESCRIPTION OF THE PREFERRED EMBODIMENT

Figure 1:
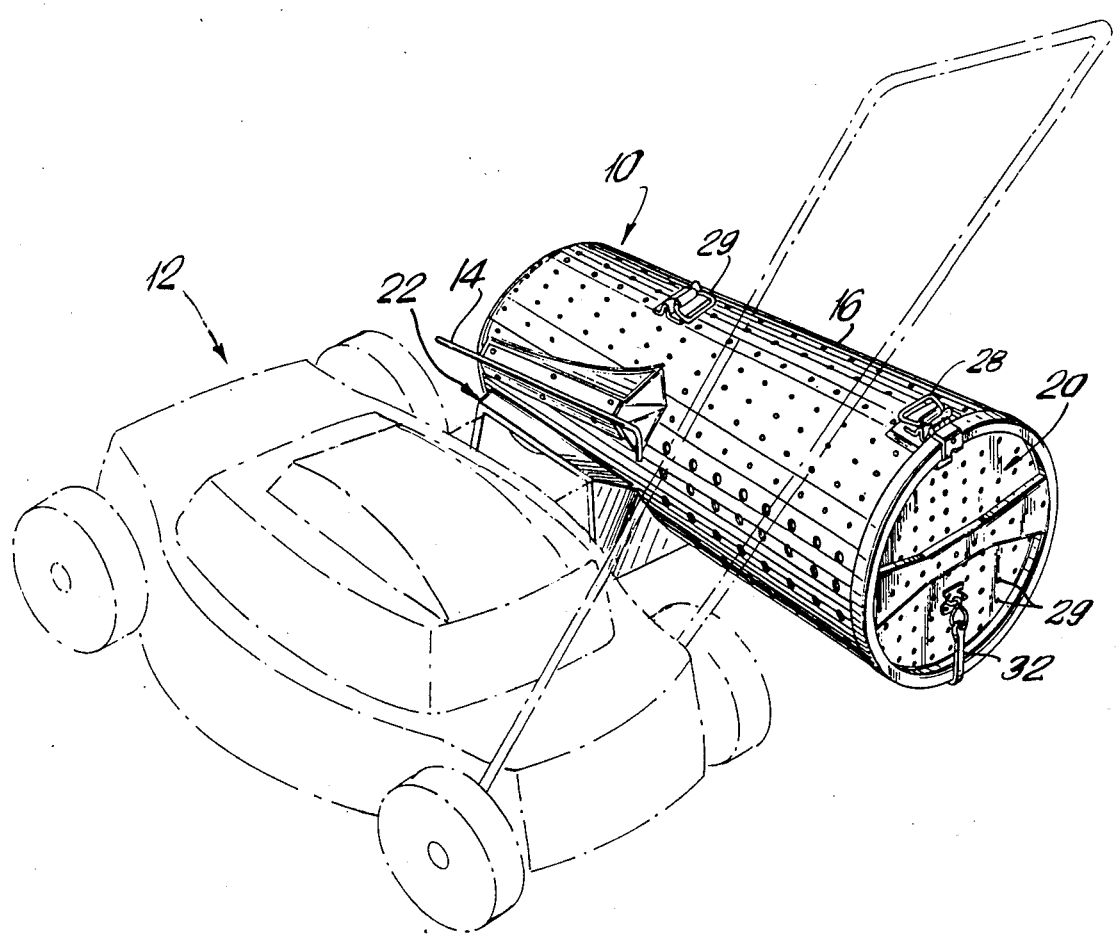
FIG. 1 is a perspective view of the grass catcher of the subject invention mounted to a conventional lawn mower.
Figures 2, 3:
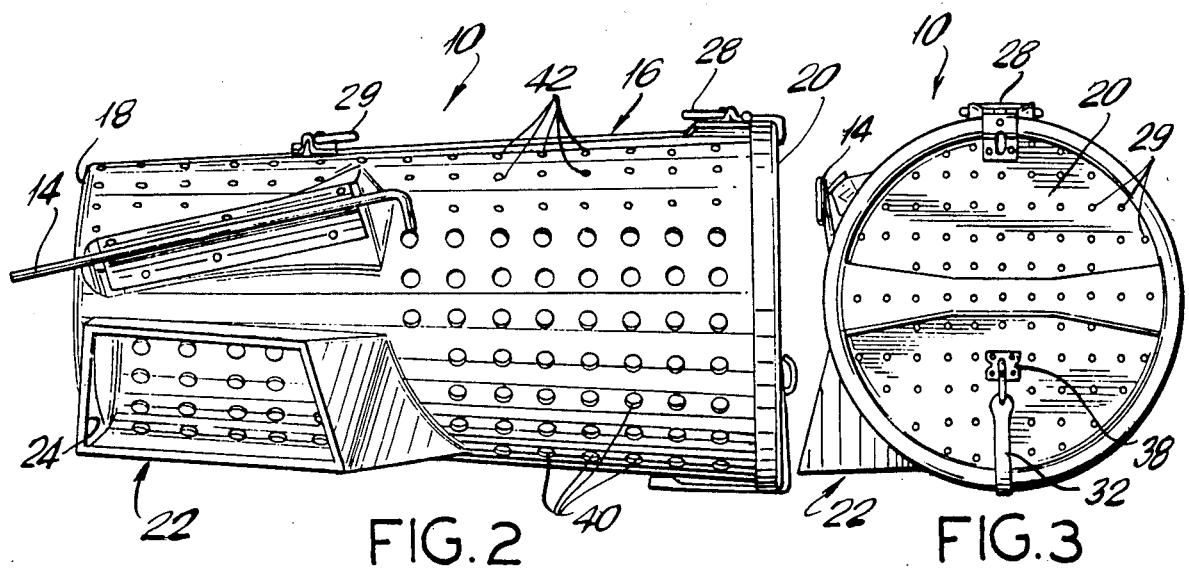
FIG. 2 is a side view of the grass catcher of the subject invention.
FIG. 3 is a first end view of the grass catcher shown in FIG. 1.

The grass catcher of the subject invention is indicated generally by the numeral 10 in FIG. 1, and is adapted for attachment to a lawn mower which is shown in broken lines and is indicated generally by the numeral 12 in FIG. 1. The grass catcher 10 includes a mounting bar 14 which is adapted to engage an appropriate supporting structure (not shown) on the lawn mower 12.

As shown more clearly in FIGS. 2-7, the grass catcher 10 is a hollow structure of generally tapered cylindrical or frustum shape. More particularly, the grass catcher 10 includes a tapered cylindrical or frustum shaped side wall 16 and opposed front and rear walls 18 and 20 respectively. The front wall 18 of grass catcher 10 is not perpendicular to the axis of the frustum shaped side wall 16. Therefore, the front wall 18 of the grass catcher 10 is of generally oval shape. Preferably the front and side walls 18 and 16 are integral with one another. In fact, the front and side walls may be of unitary construction and formed in a single injection molding or blow molding operation. The rear wall 20, however, preferably is substantially perpendicular to the axis of the frustum shaped side wall 16. Therefore, the rear wall 20 is of generally circular configuration. The precise construction and function of both the front and rear walls 18 and 20 is described in greater detail below.

The grass catcher 10 includes an entry chute 22 which is disposed adjacent the front wall 18 and which defines an entrance into the grass catcher 10. More particularly, the entry chute 22 defines a generally rectangular aperture 24 which is dimensioned to mate with a corresponding chute on the lawn mower. It is anticipated that not all grass catchers 10 manufactured in accordance with the subject invention would have exactly the same shape entry chute 22. Rather, the entry chute 22 would have a size and configuration dictated by the particular lawn mower 12 to which the entry chute 22 is to be mated.

The front wall 18, as shown most clearly in FIG. 5, is of substantially solid construction and has no apertures extending therethrough. Furthermore, as noted above, the front wall 18 is not perpendicular to the axis of the frustum shaped side wall 16. The angle of the front wall 18 is such that the frustum shaped side wall 16 has a maximum length of "L" at the side thereof that will be closest to the lawn mower 12, and a minimum length "l" on the side thereof that will be opposite the lawn mower. More particularly, the front wall 18 will be disposed at an angle "a" of between approximately 5° and 30°, and perferably about 10° relative to the longitudinal axis of the frustum shaped side wall 16. This angular alignment of the front wall 18 contributes to the rearward movement of grass clippings which enter the grass catcher 10 through the entry chute 22. As explained further below, the desired directional movement of the grass clippings is further contributed to by the solid construction of the front wall 18.

The rear wall 20 is hingedly attached to the side wall 16 by a hinge 26. Preferably, the hinge 26 is formed from aluminum or other weather resistent material that is bolted or riveted to both the side wall 16 and the front wall 20. The hinge 26 preferably includes a metallic handle 28 pivotally attached thereto. As explained herein, the metallic handle 28 contributes to the easy dumping of grass clippings from the grass catcher 10.

The rear wall 20 further includes an annular lip 30 extending around its periphery. The lip 30 is dimensioned to securely engage the portion of the frustum shaped side wall 16 opposite the front wall 18.

A latch 32 as shown most clearly in FIGS. 4, 6 and 7 extends between the side wall 16 and the rear wall 20. Preferably, the latch 32 defines an elastic member, one end of which is securely attached to the side wall 16 at support point 34 and the other end of which defines a hook 36 engagable with a bracket 38 fixedly secured to the top wall 20. As a result of this construction, the top wall 20 functions as a removable lid which can be rotated relative to the side wall 16 about the hinge 26 which can be selectively and releasably secured in the closed condition by latch 32.

The rear wall 20 includes an array of spaced apart perforations 39, which, as explained below, contribute to the desired air flow through grass catcher 10.

The frustum shaped side wall 16 of grass catcher 10 is provided with a plurality of large apertures 40 and a plurality of small apertures 42. More particularly, the large apertures 40 define an array extending around the lower portion of the grass catcher 10 while the small apertures 42 define an array extending around the upper portion thereof. As shown most clearly in FIGS. 2 and 7, the large apertures 40 begin along a line extending generally parallel to the longitudinal axis of the frustum shaped side wall 16 and at a location slightly above the entrance chute 22. The array of large apertures 40 extends between approximately 120° and 180° through the portion of the frustum shape side wall 16 that is nearest the ground when grass catcher 10 is mounted on the lawn mower. The smaller apertures 42 define an array extending circumferentially around the remainder of the side wall 16. The large and small apertures 40 and 42 have their respective centers spaced approximately 1.00 inches to 4.00 inches apart and defining a generally rectangular matrix around the frustum shaped side wall 16. Preferably, the center-to-center spacing of apertures is about 2.00 inches. The large apertures 42 have a diameter "D" of between 0.50 and 1.50 inches, as shown in FIG. 4. The small apertures 42 have diameters of between 0.25 and 0.75 inches as shown by "d" in FIG. 4. Preferably, the large apertures 40 have a diameter "D" at least twice as large as the diameter "d" of the small apertures 42.

The unique construction described and illustrated above contributes to a circulatory air flow that ensures the rearward movement of grass clippings in the grass catcher 10. More particularly, the grass catcher 10 is mounted to a lawn mower 12 as shown in FIG. 1. In this mounted position, the entrance chute 22 engages the chute of lawn mower 12 through which the grass clippings are ejected. As the lawn mower is operated, its blades rotate rapidly to trim the grass and to create air flow which causes the ejection of the grass clippings into the entrance chute 22 of grass catcher 10. The angular alignment and substantially solid, continuous construction of the front wall 18 initially urges the grass clippings in a generally rearward direction relative to the grass catcher 10. The frustum shape of the side wall 16 tends to translate this generally rearward flow of grass clippings and air into a circulatory or helical movement.

The helical movement of the grass clippings is further assured by the above described arrays of large and small apertures 40 and 42. More particularly, some of the air that might otherwise rebound randomly off a solid wall will escape through the large and small apertures 40 and 42. The larger apertures 40, located on the bottom portion of grass catcher 10 will ensure an adequate flow of air even though some grass clippings will be gravitationally deposited thereon. The apertures 40 and 42 further ensure that the preferred air flow continues as the grass catcher is gradually filled. As a result of this enhanced rearward flow of air, the grass catcher 10 is considerably less likely to become blocked, thus achieving its maximum capacity of grass clippings.

The grass catcher 10 may be removed from the lawn mower 12 after the grass catcher 10 has been sufficiently filled with clippings. This removal is facilitated by the handles 28 and 29 thereon. The grass catcher 10 can be easily carried to an appropriate location for dumping. The dumping can be readily carried out by merely separating the latch 36 from the bracket 38 to enable the rear wall 20 to be articulated about the hinge 26. After complete emptying of grass clippings from the grass catcher 10, the rear wall 20 can be locked into its closed position by merely attaching the hook 36 to the bracket 38.

In summary, a grass catcher is provided for mounting to a lawn mower. The grass catcher is formed substantially from a molded plastic with weather resistant hardware to facilitate mounting, opening and carrying the grass catcher. The grass catcher includes a generally frustum shaped side wall and front and rear end walls. The front wall is angled with respect to the longitudinal axis of the grass catcher. An entrance chute is provided adjacent the front end. The frustum shaped side wall is provided with an array of large apertures extending around the bottom portion of the grass catcher and an array of small apertures extending around the top. The various size apertures contribute to the desired helical flow of air that will carry the grass clippings toward the rear of the grass catcher. The rear wall of the grass catcher is articulated to facilitate the emptying of the grass catcher.

While the invention has been described relative to a preferred embodiment, it is obvious that various changes can be made therein without departing from the spirit of the invention as defined by the appended claims.

What is claimed is:

1. A generally hollow grass catcher for use with a lawn mower, said grass catcher comprising a frustum shaped plastic structure having a side wall and opposed front and rear walls, said rear wall being articulated to said frustum shaped side wall, an entrance chute mounted to said side wall adjacent the front wall of the grass catcher, said entrance chute being mountable to the lawn mower and defining an aperture through which grass clippings generated by the lawn mower enter the grass catcher, said frustum shaped side wall being provided with a plurality of spaced apart apertures extending therethrough and disposed at center to center spacings of between approximately 1.00 and 4.00 inches, said apertures including an array of large apertures and an array of small apertures, said large apertures being approximately twice as large as said small apertures and being disposed in the portion of the side wall that will be nearest the grass when the grass catcher is mounted on the lawn mower, said large apertures having diameters between approximately 0.50 and 1.50 inches, and said small apertures having diameters between approximately 0.25 and 0.75 inches, said apertures being operative to provide enhanced circulatory air flow through said grass catcher thereby facilitating the flow of grass clippings from said entrance chute through said plastic structure toward said rear wall.

2. A grass catcher as in claim 1 wherein the front wall is substantially free of apertures therein.

3. A grass catcher as in claim 1 wherein the front wall is integral with the side wall.

4. A grass catcher as in claim 1 wherein the entrance chute is integral with the side wall.

5. A grass catcher as in claim 1 wherein the front wall is angularly aligned relative to the longitudinal axis of the frustum shaped side wall.

6. A grass catcher as in claim 5 wherein the angle of the front wall is such that the front and rear walls are closest to one another at their respective points thereon most distant from the lawn mower.

7. A grass catcher as in claim 1 wherein the rear wall is provided with a plurality of apertures extending therethrough.

8. A grass catcher as in claim 1 wherein the array of large apertures extends through a circumferential arc of between approximately 120° and 180°.

9. A generally hollow grass catcher for mounting to a lawn mower, said grass catcher comprising a frustum shaped side wall and opposed front and rear walls, said frustum shaped side wall including opposed top and bottom portions, said frustum shaped wall being characterized by an entrance aperture extending through the bottom portion thereof and generally adjacent the front wall of the grass catcher, said frustum shaped side wall further including an array of spaced apart large apertures extending through the bottom portion thereof and an array of spaced apart small apertures extending through the top portion thereof, each of said large apertures being at least approximately twice as large as each of said small apertures, said large apertures having diameters of between approximately 0.50 inches and 1.50 inches and said small apertures having diameters of between approximately 0.25 inches and 0.75 inches, the front wall of said grass catcher being of substantially solid construction and being disposed in non-perpendicular alignment to the longitudinal axis of the frustum shaped side wall, said rear wall being provided with a plurality of spaced apart apertures therethrough, said rear wall being hingedly attached to said side wall to enable selective opening and closing of the grass catcher.

10. A grass catcher as in claim 9 wherein the front wall is aligned at an angle of between approximately 5° and 30° to a plane perpendicular to the longitudinal axis of the side wall.

11. A grass catcher as in claim 10 wherein the large and small apertures in the frustum shaped side wall have center-to-center spacings of between approximately 1.00 inches and 3.00 inches.

12. A generally hollow plastic grass catcher for mounting to a lawn mower, said grass catcher comprising a frustum shaped side wall, a front wall integral with said side wall and a rear wall connected to said side wall for at least partial removal therefrom, said frustum shaped side wall including opposed top and bottom longtudinally extending portions, said frustum shaped wall being characterized by an entrance aperture extending through the bottom portion thereof and generally adjacent the front wall of the grass catcher, said frustum shaped side wall further including an array of spaced apart large apertures extending through the bottom portion thereof and an array of spaced apart small apertures extending through the top portion thereof, each of said large apertures being at least approximately twice as large as each of said small apertures, the front wall of said grass catcher being of substantially solid construction and being disposed in non-perpendicular alignment to the longitudinal axis of the frustum shaped side wall, said rear wall being provided with a plurality of spaced apart apertures therethrough.

13. A generally hollow plastic grass catcher for mounting to a lawn mower, said grass catcher comprising:
a generally elongated frustum shaped side wall having opposed small and large diameter ends, said frustum shaped side wall including a first array of spaced apart apertures extending through one longitudinally extending portion of said frustum shaped side wall and a second array of spaced apart apertures extending through the remainder of said frustum shaped side wall, each of the apertures in said first array being approximately one-half as large as the apertures in the second array;
a front wall integral with said frustum shaped side wall at the small diameter end thereof;
a rear wall attached to said frustum shaped side wall at the small diameter end thereof;
a rear wall attached to said frustum shaped side wall for at least partial removal therefrom, said rear wall being characterized by an array of spaced apart apertures extending therethrough; and
a mounting chute extending into said grass catcher generally adjacent the front end thereof, whereby the mounting chute may be mounted to a lawn mower and whereby the arrays of apertures in said frustum shaped side wall and said rear wall enable an efficient circulation of air for depositing grass in said grass catcher.

* * * * *